United States Patent Office 3,474,658
Patented Oct. 28, 1969

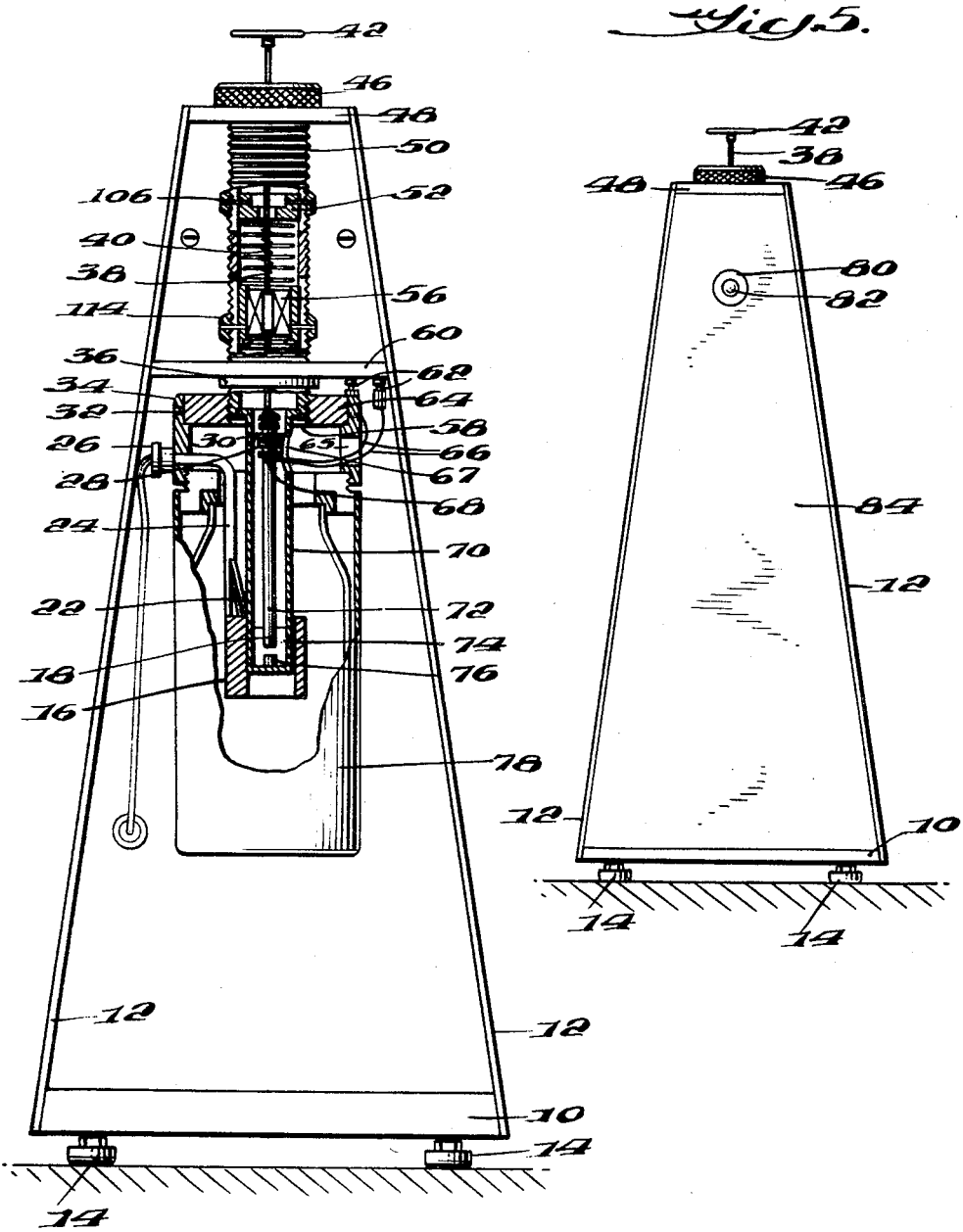

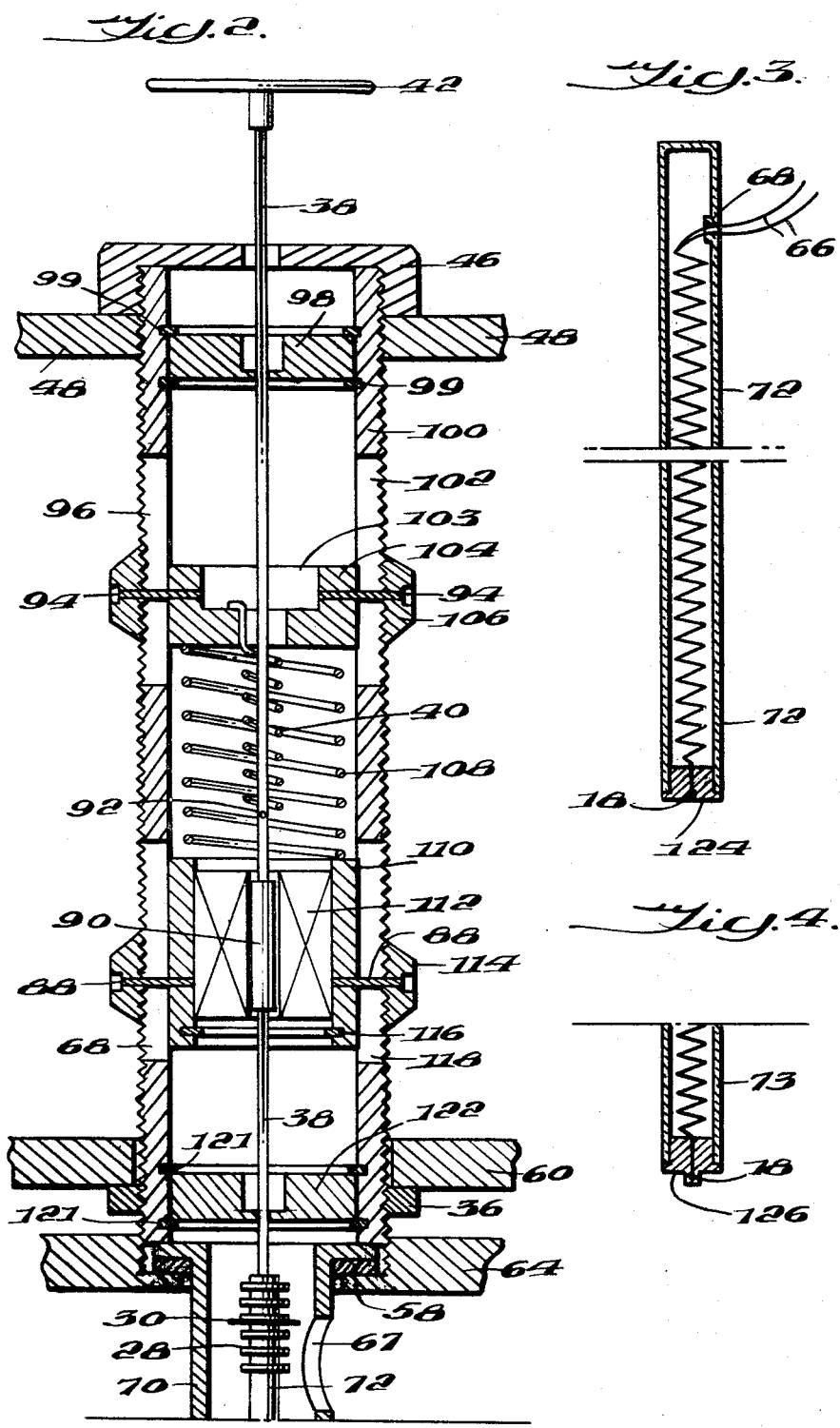

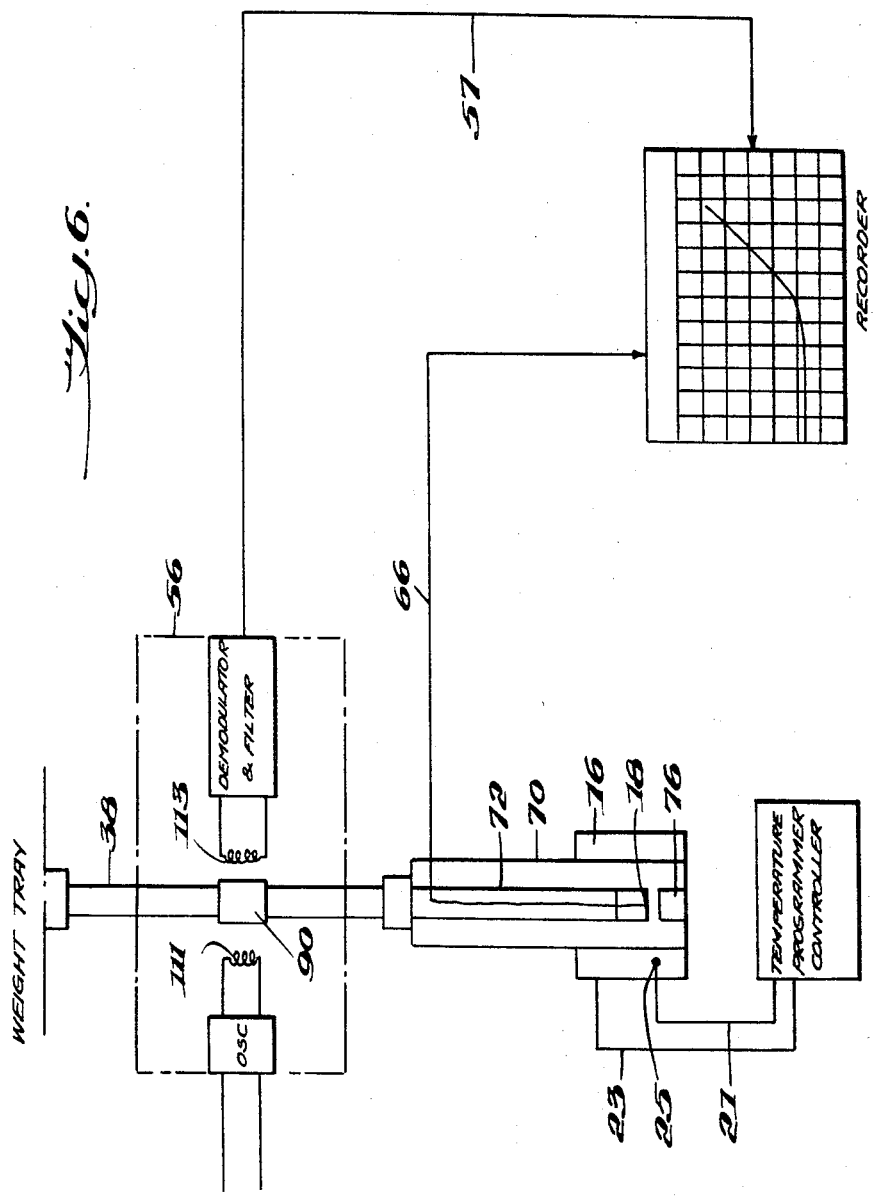

3,474,658
THERMOMECHANICAL ANALYZER
Paul F. Levy and Raymond W. Tabeling, New Castle County, Del., assignors to E. I. du Pont de Nemours and Company, Wilmington, Del., a corporation of Delaware
Filed May 12, 1966, Ser. No. 549,612
Int. Cl. G01n 25/02, 3/42
U.S. Cl. 73—16                                    7 Claims

ABSTRACT OF THE DISCLOSURE

The expansion or penetration of a substance is measured by detecting the vertical displacement of a probe in contact with the sample. An adjustable spring is provided to relieve the upper face of the sample from the weight of the probe during expansion measurements. Static friction is reduced by a vibrating means. A blunt end probe is provided for expansion measurements and a tip projection probe provided for penetration measurements.

---

This invention relates to a measuring and testing method and apparatus and more particularly to a thermomechanical analyzer and method for determining a change in the physical properties of a substance by measuring the volumetric expansion or contraction of a substance.

The physical and chemical properties of polymeric materials change very noticeably with changes in temperature. These property changes occur over very small temperature ranges if not at distinct temperatures. A first order transition involves the disappearance of crystalline regions in a polymer while a second order transition, or glass transition, is associated with a change from a relatively hard, brittle, glassy material to a softer, more flexible, rubbery substance.

The glass transition temperature, Tg, is closely allied with other property changes of a substance such as a change in the temperature coefficient of expansion or of the specific heat. Other properties which exhibit changes at the glass transition temperature include thermal conductivity, refractive index, dielectric loss and stiffness. The glass transition is discernible whether a substance is in a partially crystalline state or whether the material has been supercooled in its amorphous state.

One method for determining the glass transition temperature is to measure the temperature at which a substance exhibits a marked change in its rate of expansion as a function of temperature. Another method is to measure the temperature at which a small weighted shaft will penetrate a sample of material being tested. Various devices have been devised to accomplish these measurements. Heretofore their accuracy has been impaired by static friction inherent within their moving parts, thus yielding poor data and, resultantly, inaccurate determinations of the glass transition temperature.

Although this invention will be described in a preferred embodiment for determining the glass transition temperatures of polymers, it should be readily apparent to one skilled in the art that the herein described instrument is not limited to this particular application. It can also be used for studying physical changes of any solid or viscous material, e.g., metals, cosmetics, butter, etc., with a concomitant change in temperature. The subject invention can also be employed in conjunction with isothermal studies of solids or viscous materials as a function of time.

Therefore, it is an object of this invention to provide an instrument substantially free of static friction in its movable constituents. It is a further object of this invention to provide a means for substantially relieving opposition to the small expansive force exerted by a test sample on the responsive member of a test instrument.

The objects of this invention are realized by a thermomechanical analyzer which includes a supporting frame, a head assembly having a vertical shaft slideably mounted therein, a probe attached to the shaft at one end, a sample holder positioned in receptive relation to the probe, a heating means for uniformly heating a sample of material to be tested, and a sensing means responsive to the vertical displacement of the shaft occurring upon expansion of the sample or penetration of the sample by the probe, the improvement therein constituting the subject invention comprising an adjustable suspension mechanism operably attached between the head assembly and the shaft, thereby slideably suspending the shaft within the head assembly, and a vibrating means operably associated with the analyzer for substantially eliminating the static friction between the head assembly and the shaft.

The embodiments of this invention and their advantages can be more readily understood by referring to the accompanying drawings.

FIG. 1 is a partially schematic plan view of the thermomechanical analyzer;

FIG. 2 is an enlarged longitudinal cross-sectional view of the head assembly;

FIG. 3 and FIG. 4 are longitudinal cross-sectional views of the probes;

FIG. 5 is a partially schematic rear view of the analyzer;

FIG. 6 is a schematic diagram of a completely instrumented analyzer;

Figure 7:
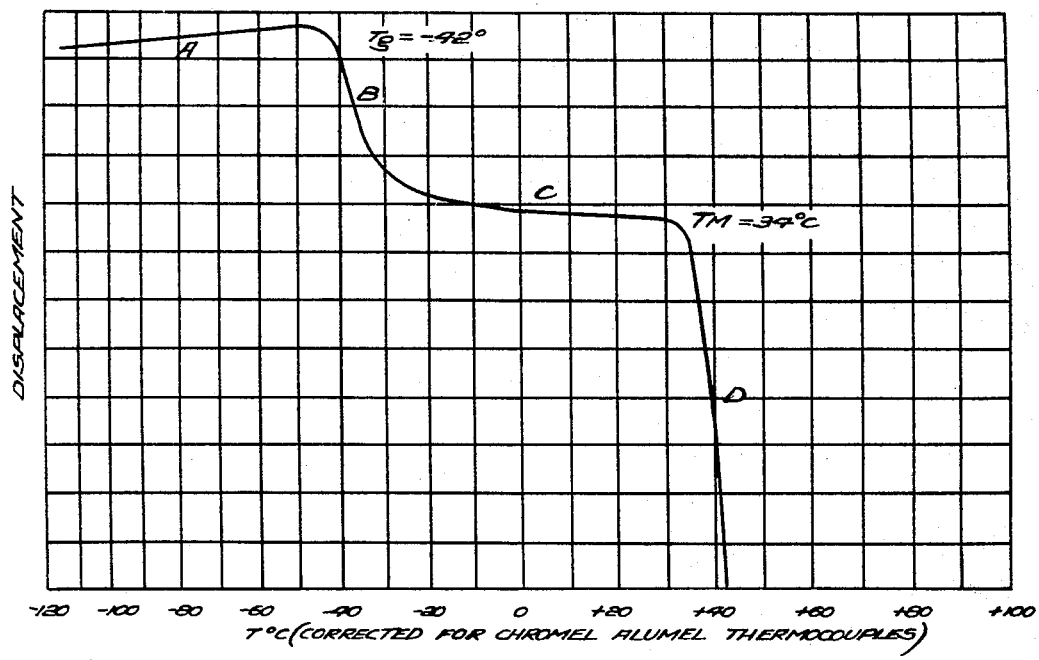
FIG. 7 and FIG. 8 are reproductions of charts on which experimental data has been automatically plotted.

To more fully understand an embodiment of the invention refer to the partially schematic view of FIG. 1. The thermomechanical analyzer comprises a base 10 having attached thereto rising support members 12. Affixed to the upper portion of rising support members 12 are an upper horizontal support 48 and a lower horizontal support 60. The horizontal support members 48 and 60 have openings therein to receive an outer threaded, vertically positioned, tubular head assembly 50. The head assembly 50 is held securely in position by an upper retainer nut 46 screwably fastened against the top of the upper horizontal support 48 and a lower retainer nut 36 screwably fastened against the bottom of the lower horizontal support 60. Any suitable material, for example, aluminum, can be used for construction of the supporting structure of the analyzer.

Four adjustable leveling legs 14 mounted to the base 10 give the entire analyzer horizontal stability.

A shaft 38 constructed of any suitable non-magnetic metal, for example, a non-magnetic stainless steel, is slideably positioned within the head assembly 50, and is suspended therein by an adjustable suspension mechanism comprising a small helical spring 40 connected to the shaft 38 and to a vertically adjustable position control, generally designated as 52. Housed within the lower portion of the head assembly is an adjustable transducer, generally designated as 56, which translates vertical motion of the shaft 38 into an electrical output signal. Affixed to the top of the shaft 38 is a weight tray 42 upon which weights can be placed to axially load the shaft 38.

An insulated flask assembly has three parts, an insulated flask 78, and a two piece cap. The inner ring 64 of the cap is screwably attached to the lower portion of the head assembly. The outer ring 34 is slideably fitted to the inner ring 64 and is secured thereto by a set screw 32. The insulated flask 78 is in turn screwably attached to the outer ring 34 of the cap. The flask assembly is of the Dewar type, and is constructed of materials to withstand the operating temperatures of the analyzer, that is, from −250° C. to 300° C.

A sample holder 70 is made of a material with a low coefficient of expansion, preferably quartz. The upper lip of the sample holder is positioned in a circular recess in the top of inner flask cap ring 64. A resilient washer 58 is placed between the upper lip of the sample holder 70 and the inner ring 64 to prevent damage to the sample holder 64 when the assembly is screwably fitted to the bottom portion of the head assembly 50. Thus, when the inner ring 64 is fastened to the head 50, the sample holder is intimately contacted with the head 50 and held firmly in that position by the resilient washer 58 and the inner cap ring 64. (For a more detailed view of this assembly, see FIG. 2).

A hollow cylindrical probe 72 is concentrically positioned below the shaft 38 and is held in secure communication thereto by a chuck 28 and spring clip 30. The probe 72 is constructed of the same material as the sample tube 70, preferably quartz, and has a thermocouple 18 imbedded in the lower tip thereof. Lead wires 66 spiral up inside the probe 72, projecting through a side opening 68 near the top of the probe. These lead wires 66 run through a slot 67 in the sample holder tube and an opening 65 in the outer ring 34 of the cap of the insulated flask. The lead wires 66 are attached to thermocouple connectors 62 on the lower horizontal support member 60.

A cylindrical heater 16 with a self-contained control thermocouple is fitted around the lower portion of the sample holder tube 70. The heater is held in position by tightening a nut 26 on the heater support arm 24 which locks it in position in a slot provided in the outer ring 34 of the insulated flask cap.

In another embodiment not shown in the drawings, the weight tray 42 could be removed, and a probe attached to the upper portion of shaft 38. A sample holding means could then be positioned above the head assembly in a receptive relation to the thus altered probe arrangement. A heating means would be provided above the head assembly to uniformly heat a sample held by the sample holder. The purpose of such modification would be to eliminate any system distortion caused by the excess heat flow through the head assembly when the analyzer is operated at temperature near the upper limit of its operating range.

In the enlarged cross-section of the head assembly of FIG. 2, the elements are generally designated as in FIG. 1. As shown, the tubular head assembly housing 100 is mounted on upper and lower horizontal support members, 48 and 60, respectively, and secured thereon with retainer nuts 36 and 46.

A sleeved guide 98 is positioned in the upper portion of the head 100 and retained from the top and bottom by retainer rings 99. Another sleeved guide 122 is positioned in the lower portion of head 100 and held in that position by retainer rings 121. The guide surfaces of the sleeved guides 98 and 122 are axially aligned to receive the shaft 38. The guide is constructed of brass in this embodiment; however, other materials such as stainless steel or a gem, e.g., sapphire, are equally operable.

The shaft 38 is slideably mounted in the axially aligned guides 98 and 122. The shaft is slideably suspended inside the head by an adjustable suspension mechanism. An annular piston 104 having a concentric bore and a larger concentric recess 103 on its upper surface is slideably mounted inside the head 100. Pins 94 are securely fastened to the sides of the annular piston 104 and project through vertical slots 96 and 102 in the sides of the head 100 and into circular slots provided on the inner threaded surface of the upper thumb nut 106. A small helical spring 40 is hooked into the circular recess in the annular piston 104 and is spiralled around the shaft to a point 92 where it is fastened to the shaft.

Below the point 92 where the spring 40 is attached to the shaft, a cylindrical sleeve 110 is fitted inside the head 100. Annular differential transformer windings 112 are positioned inside the sleeve 110 and are held in place by retaining ring 116. Fixed to the shaft 38 in the center of the annular windings 112 is the differential transformer core 90. The vertical movement of the core 90 within the windings 112 causes a variation in the D.C. output of the differential transformer thus converting the vertical motion of the shaft into an electrical output usable with an automatic recording means. The sleeve 110 is made vertically adjustable as is cylinder 104, by pins 88 projecting through the slots 68 and 118 in the head 100 into the annular slot provided therefor in the lower thumb nut 114.

Helical spring 108 is inserted between annular piston 104 and cylindrical sleeve 110 and is held in compression thereby. The force asserted on the members 104 and 110 by the spring 108 causes the threads of the thumb nuts 106 and 114 to be tightly contacted against the threads on the head 100, thus preventing "backlash" or slippage of the thumb nuts from their setting on the head.

The cross-sectional view of FIG. 3 and FIG. 4 are the probes to be used with the analyzer of FIG. 1. The preferred embodiment of the probe is a hollow quartz cylinder 72. FIG. 3 illustrates the blunt tipped probe. The lower tip of the probe comprises a plug 124 made of stainless steel, or some other suitable material, having a blunt outer surface, and having a thermocouple 18 imbedded therein. The stainless steel plug is bonded to the quartz cylinder by a suitable binder, e.g. an epoxy glue. By blunt outer surface of the plug, it is meant an essentially flat transverse surface with the corners of the plug rounding toward the vertical sides of the cylinder with a corner radius of from about 0.005 to about 0.010 of an inch. The thermocouple leads 66 spiral upward from the imbedded thermocouple 18 through the center of the hollow cylindrical probe 72 and project through an opening 68 toward the upper end of the probe.

The blunt tipped probe is used for expansion measurements while the probe of FIG. 4 is utilized for making penetration determinations of the changes in the physical properties of a substance. The probe of FIG. 4 differs from the one previously described in that the stainless steel plug 126 has a tip projection as an integral part thereof. The tip projection has a thermocouple 18 imbedded in it. The diameter of the tip projection 126 is not critical, but should be small enough to easily penetrate a sample when the sample passes through a phase transition. The diameter should be a known value so that the pressure exerted by it on the sample can be calculated. A preferred diameter is about 0.025 of an inch.

FIG. 5 is a rear view of the analyzer of FIG. 1, showing the upper retainer nut 46, the shaft 38, weight tray 42, and the adjustable leveling legs 14. The base 10 and rising support members 12 have securely attached thereto a back plate 84. Securely mounted on the back plate 84 is an electromagnetically actuated vibrator or buzzer 80. In electrical connection between a power source (not shown) and the vibrator or buzzer 80 is a rheostat 82 for varying the power input to the buzzer coils. The purpose of the buzzer 80 is to produce a very small amount of vibration in the supporting structure of the analyzer which is transmitted through the back plate 84 to the head assembly, shown in detail in FIG. 2. The vibration thus produced in the head assembly tends to keep the shaft spaced from the bearings at any given point in time. The result is to substantially remove any static guide friction which would impede the vertical movement of the shaft when a very small axial force is exerted upon it. In fact, the small amount of vibration produced in the head assembly is sufficient such that an axial weight of less than one milligram will impart axial motion in the shaft.

The vibration generated in the shaft positioned in the guides can have no greater amplitude than the clearance between the shaft and the bearings. If the vibration were greater than the clearance, it would produce no effect to further the desired result of relieving the static guide friction. In fact, the result of vibration greater than the clearance would have a detrimental effect upon the apparatus itself by inflicting undue stress on the sensitive operating parts, and would also produce poor graphic results. The frequency of the vibration is also an important factor in the successful operation of the subject analyzer. The lower limit of the frequency is dependent upon the response time of the sensing element measuring the vertical displacement of the shaft. A convenient frequency of vibration is supplied by the normal 110 volt A.C. power source, i.e. 60 cycles per second. This is a sufficiently high frequency to relieve any interference the vibration might cause to the operation of the transducer.

The vibrator or buzzer used to impart this vibration is of the common type energized by 110–120 volt A.C. current, consisting of an A.C. coil and a clapper or armature situated near the coil. As the A.C. voltage wave cycles from maximum through zero back to maximum voltage, the rise of the electromagnetic field in the coil causes the clapper to be pulled toward the coil. When the magnetic field collapses, the clapper is released and springs back into its normal position. Normally, a voltage sufficiently large to cause the clapper to solidly contact the coil, generating noise, is supplied. In this particular application, however, the voltage impressed upon the coil is reduced by the rheostat 82 to cause the armature to merely vibrate, not contacting the coil. The vibration thus produced will effectively vibrate the head of the thermomechanical analyzer.

The operational principles of the thermomechanical analyzer are relatively simple as depicted in the schematic drawing of FIG. 6. The heart of the analyzer is the transducer, comprising a movable core differential transformer 56. A self-contained oscillator supplies A.C. input from a regulated power source (not shown) to the primary windings 111. The position of the core 90, which is connected to the probe 72 through the shaft 38, determines the voltage induced in the transformer secondary windings 113. Resultant rectified output is a D.C. voltage proportional to the core displacement from electrical center. This voltage is applied directly to the Y-axis of the automatic graphic recorder or plotter through lead 57. The thermocouple 18 attached to the probe bottom, rests on the sample 76 and provides an output proportional to the sample temperature. This voltage, compensated with a suitable reference junction (not shown), is applied to the X-axis of the recorder through lead 66. The bottom portion of the sample holder 70, the probe 72, and the sample 76 are surrounded by a cylindrical heater 16 with a self-contained control thermocouple 25, electrically coupled to the programmer by lead 21. The heater is driven by a suitable temperature programmer controller through power input lead 23. The controller can be programmed to give a constant temperature environment to the sample or to heat the sample at a predetermined rate.

When the analyzer is operated to obtain penetration measurements, the probe with a small tip projection, illustrated in FIG. 4, is utilized. Referring back to FIG. 1, a sample 76 is inserted through the hole 74 in the sample holder tube 70 and is placed on the bottom thereof. The penetration probe 73 is lowered into contact with the sample by adjusting the upper thumb nut 106 on the head assembly. The transducer is then adjusted to zero transformer output, i.e., electrically centering the core in the transformer, by adjustment of the lower thumb nut 114. The heater 16 is then positioned around the sample tube 70 and fastened to the outer ring 34 of the flask cap with the heater thumb nut 26. If the sample substance has a glass transition temperature below ambient temperature, the sample is cooled by partially filling the insulated flask with liquid nitrogen, or some other suitable coolant, and positioning it around the sample until the sample reaches the desired temperature. The excess coolant is then emptied from the flask and the flask replaced on the flask cap. The heater leads 22, comprising the power input leads and the self-contained thermocouple leads are connected to a temperature programmer controller (as shown schematically in FIG. 6). The probe thermocouple leads and the output from the transducer are then operably connected with an automatic graphic recorder (shown schematically in FIG. 6). An axial load is placed on the probe by depositing small weights on the weight tray. The temperature programmer controller is then actuated, causing the sample to be heated at a predetermined rate, for example 5° C. per minute. The resultant temperature rise and vertical expansion of the sample is automatically plotted on the recorder.

When operating the analyzer for expansion measurements, minimum loading is desired. Therefore, after the sample 76 has been placed in the sample holder tube, the expansion probe 72 (illustrated in FIG. 3) is lowered into contact with the sample 76 by adjustment of the upper thumb nut 106. The sample is relieved from the weight of the probe by the helical spring suspending the shaft 38 and the probe 72. No axial load is placed upon the shaft. With the above exception, the same general procedure followed for a pentration measurement is then followed for the expansion measurement.

The net result of both the penetration and expansion measurements is a trace of probe displacement versus (1) sample temperature at a constant heating rate, or (2) time at a constant temperature.

Figure 8:
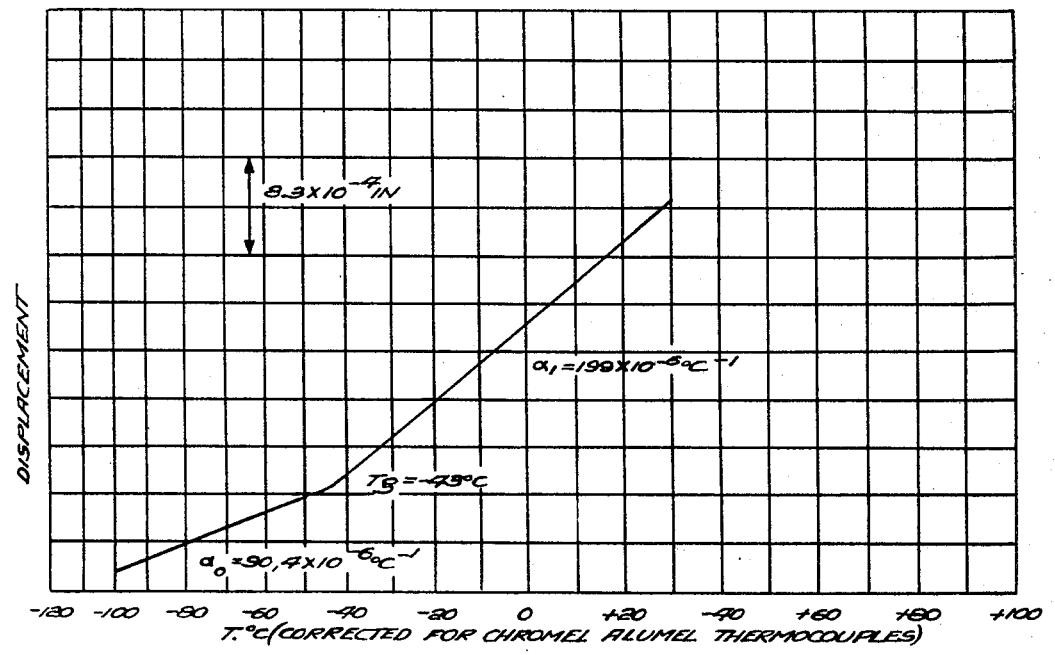

The plots reproduced in FIG. 7 and FIG. 8 are reproductions of the recorded results obtained by operating the subject analyzer. FIG. 7 is a reproduction of the graph obtained when the analyzer was operated in its penetration mode with the probe having a small tip projection. The displacement of the probe is plotted versus the temperature of a small sample of polychloroprene. The polychloroprene sample was cooled below $-100°$ C. with liquid nitrogen and then heated at a rate of 5° C. per minute. The first deviation from baseline A is the softening point of the polychloroprene. The portion B depicts the first penetration by the tip projection into the sample. The glass transition temperautre, Tg, can be obtained by extrapolating the straight-line portions, A and B, of the curve and noting the temperature at which they intersect, i.e., $-42°$ C. Portion C of the curve gives the expansion profile for the neoprene in its rubbery state. The melting temperature, 34° C., of the sample can be obtained by noting the intersection of the two straight-line portions of the curve, C and D.

A typical expansion profile of another sample of polychloroprene is shown in FIG. 8. The sample exhibits a change in the linear expansion coefficient, $\alpha$, from $90.4 \times 10^{-6}/°$ C. to $199 \times 10^{-6}/°$ C. at the glass transition temperature, Tg. This occurs at the extrapolated intersection of the two linear sections of the curve ($-43°$ C.). The results for Tg obtained when operating the analyzer in the penetration mode are reproducible $\pm 1°$ C., and are reproducible to $\pm 2°$ C. when operating the analyzer in the expansion mode. These results are in good agreement with the glass transition temperature of this sample as determined by independent methods.

The advantages of this analyzer over those of the prior art are centered on the adjustable spring suspension mechanism and the electromagnetically actuated vibrating means. Reference will first be made to the subject analyzer when it is being operated in the penetration mode, When a polymer sample passes through the glass transition phase, it changes from a glassy, brittle substance to a flexible, rubbery substance. The axially weighted probe then begins to sink into the top surface of the sample. But due to the static friction inherent within the shaft and guide system to which the probe is attached, the probe does not move immediately when the rigidity of the upper face of the sample begins to fade. The shaft will "stick" within the guides until the opposing force of the sample face sufficiently relaxes. As the sample becomes more flexible, the "sticking" of the shaft will recur followed by another drop of the probe. The result of the "sticking" of the probe within the guides is the production of an erratic step function on the recorder graph. The result should be a smooth transition curve preceded and followed by smooth linear curves, as shown in FIG. 7. The "sticking" of the shaft is surmounted by the vibrator attached to the rear plate of the analyzer. The vibrations transmitted to the guides and the shaft maintain a spacing between the shaft and the face of the guide. Thus, because there is only momentary contact between the shaft and guide surfaces, the static friction factor is substantially reduced.

When the analyzer is being operated in the expansion mode, the lower blunt end of the probe is positioned upon the top surface of a sample resting in the sample tube. Expansion measurements of a sample polymer prior to the subject analyzer could not be made after the sample had passed through the glass transition stage. The weight of the probe would cause it to sink into the sample, opposed to the desired result of rising with the vertical expansion of the sample. This drawback has been overcome by suspending the shaft and probe over the sample by the small helical spring adjustably attached between the shaft and the head assembly. The suspension mechanism thus operates to relieve the upper face of the sample from the weight of the probe and the shaft while still allowing contact between the blunt end of the probe and the upper sample face. Upon heating, the sample now can expand freely and at the same time force the probe and shaft vertically upward.

However, due to the inherent static friction between the shaft and the guides, the shaft still will not move freely upward. This problem is overcome by vibrating the head assembly with the small vibrator or buzzer attached to the rear plate of the analyzer, as was done above. The graphic results obtained with this further modification are now smooth and accurate, as shown in FIG. 8, compared to an erratic step function obtained without the vibration.

Although a unitary preferred embodiment of the subject invention has been illustrated and described in the foregoing portion of the specification, it is manifest that diverse alterations may be effected without deviating from the spirit of the invention or the scope of the annexed claims.

What is claimed is:

1. A thermomechanical analyzer for measuring penetration or expansion of a substance comprising:
   a supporting frame,
   a head assembly vertically mounted on said frame having an upper portion and a lower portion,
   vertically axially aligned guides mounted in the upper and lower portions of said head assembly,
   a shaft slideably positioned in said guides,
   vibrating means operably attached to said analyzer for substantially eliminating the static friction between said guides and said shaft,
   an adjustable spring suspension mechanism operably attached between said shaft and said head assembly,
   a transducer adjustably mounted within said head assembly, said transducer responsive to the vertical displacement of said shaft,
   a thermocouple responsive to the temperature of the sample of said substance being analyzed,
   a sample holder positioned in concentric relation to said shaft and having a lower sample receiving end, said sample holder removably mounted on said analyzer,
   a probe positioned in concentric spaced relation inside said sample holder, said probe removably attached to the lower end of said shaft, and
   an insulated flask assembly positioned in spaced exterior relation to said sample holder and removably connected to said analyzer.

2. The analyzer of claim 1 further comprising:
   a heater positioned in spaced relation between the lower end of said sample holder and said insulated flask assembly, said heater removably attached to said analyzer.

3. The analyzer of claim 1 wherein said suspension mechanism comprises a spring having two ends adjustably attached at one end to said head assembly and attached at the other end to said shaft, thereby suspending said shaft within said head assembly.

4. The analyzer of claim 1 wherein said vibrating means comprises an electromagnetically actuated vibrator.

5. The analyzer of claim 1 wherein a force of one milligram is sufficient to actuate said shaft.

6. A thermomechanical analyzer for measuring penetration or expansion of a substance comprising:
   a supporting frame,
   a head assembly vertically mounted on said frame having an upper portion and a lower portion,
   vertically axially aligned guides mounted in the upper and lower portions of said head assembly,
   a shaft slideably positioned in said guides,
   vibrating means operably attached to said analyzer for substantially eliminating the static friction between said guides and said shaft,
   an adjustable spring suspension mechanism operably attached between said shaft and said head assembly,
   a transducer adjustably mounted within said head assembly, said transducer responsive to the vertical displacement of said shaft,
   a sample holder positioned in concentric relation to said shaft and having a lower sample receiving end, said sample holder removably mounted on said analyzer, and
   a probe positioned in concentric spaced relation inside said sample holder and removably attached to the lower end of said shaft, said probe comprising a shaft constructed of a material with a low coefficient of expansion having a tip projection on the lower end thereof, said projection having a thermocouple imbedded therein.

7. A thermomechanical analyzer for measuring penetration or expansion of a substance comprising:
   a supporting frame,
   a head assembly vertically mounted on said frame having an upper portion and a lower portion,
   vertically axially aligned guides mounted in the upper and lower portions of said head assembly,
   a shaft slideably positioned in said guides,
   vibrating means operably attached to said analyzer for substantially eliminating the static friction between said guides and said shaft,
   an adjustable spring suspension mechanism operably attached between said shaft and said head assembly,
   a transducer adjustably mounted within said head assembly, said transducer responsive to the vertical displacement of said shaft,
   a sample holder positioned in concentric relation to said shaft and having a lower sample receiving end, said sample holder removably mounted on said analyzer, and
   a probe positioned in concentric spaced relation inside said sample holder and removably attached to the lower end of said shaft, said probe comprising a shaft constructed of a material with a low coefficient of expansion having a blunt lower end, said probe having a thermocouple imbedded in said blunt end.

References Cited

UNITED STATES PATENTS

| | | | |
|---|---|---|---|
| 1,512,804 | 10/1924 | Roucka | 73—496 |
| 2,396,383 | 3/1946 | Moore | 33—148 |
| 2,448,964 | 9/1948 | Dietert | 73—16 |
| 2,759,353 | 8/1956 | Roberts | 73—16 |
| 2,892,342 | 6/1959 | Gross et al. | 73—82 |
| 3,057,199 | 10/1962 | Koehne | 73—321 |
| 3,086,385 | 4/1963 | Branchereau et al. | 73—16 |

JAMES J. GILL, Primary Examiner

HERBERT GOLDSTEIN, Assistant Examiner

U.S. Cl. X.R.

73—82